United States Patent
Kamishima et al.

[11] Patent Number: 6,161,065
[45] Date of Patent: Dec. 12, 2000

[54] CONTROL SYSTEM FOR VEHICULAR ILLUMINATION

[75] Inventors: Hiroyuki Kamishima; Masakazu Imai; Toshimasa Miwa, all of Kanagawa-ken, Japan

[73] Assignee: Nissan Motor Co., Ltd., Kanagawa-Ken, Japan

[21] Appl. No.: 09/055,780

[22] Filed: Apr. 7, 1998

[30] Foreign Application Priority Data

Apr. 8, 1997 [JP] Japan ..................................... 9-089673

[51] Int. Cl.$^7$ ........................................................ B60Q 1/02
[52] U.S. Cl. .............................. 701/36; 701/49; 340/469
[58] Field of Search .......................... 701/49, 36; 315/77, 315/82, 83; 307/10.8; 340/457.2, 458, 468, 469

[56] References Cited

U.S. PATENT DOCUMENTS

| | | | |
|---|---|---|---|
| 4,376,909 | 3/1983 | Tagami et al. | 315/82 |
| 4,613,791 | 9/1986 | Kurihara et al. | 315/82 |
| 4,728,861 | 3/1988 | Kurihara et al. | 315/83 |
| 4,956,580 | 9/1990 | Yun-Shang | 315/83 |
| 5,235,178 | 8/1993 | Hegyi | 250/226 |

FOREIGN PATENT DOCUMENTS 5-56621  7/1993  Japan .

*Primary Examiner*—Tan Nguyen
*Attorney, Agent, or Firm*—McDermott, Will & Emery

[57] ABSTRACT

A head lamp (3) is turned off when a first set time (T1) has lapsed in a state that a circumferential illumination intensity (B) is equal to or higher than a first level (B1), or when the vehicle has run a first set distance (L1) in a state that the circumferential illumination intensity (B) is equal to or higher than a second level (B2) lower than the first level (B1). Accordingly, even if the vehicle is stopped immediately after a moving to a bright place from a dark place, or even if the peripheral environment has become bright during a stop in the dark place, the head lamp (3) can be securely turned off.

10 Claims, 3 Drawing Sheets

| CIRC ILLUM INTENSITY B | | HEAD LAMP | SMALL LAMPS |
|---|---|---|---|
| LIGHT ↕ DARK | B1 | CONTINUED FOR T1 --> SUDDEN LIGHT OFF | CONTINUED FOR T2 --> LIGHT OFF |
| | B2 | CONTINUED OVER L1 --> LIGHT OFF | |
| | B3 | | |
| | B4 | | CONTINUED OVER L2 OR FOR T3 --> LIGHT ON |
| | B5 | CONTINUED OVER L1 --> LIGHT ON | |
| | | CONTINUED FOR T4 --> SUDDEN LIGHT ON | CONTINUED FOR T4 --> SUDDEN LIGHT ON |

CONTROL SYSTEM FOR VEHICULAR ILLUMINATION

FIELD OF THE INVENTION

The present invention relates to a vehicular illumination control system as a circumferential apparatus for vehicular illumination in terms of light projection of a vehicle, in which a lamp for illumination is turned on and off in correspondence to a circumferential illumination intensity around the vehicle.

The present invention relates to a vehicular illumination control system as a circumferential apparatus for vehicular illumination in terms of light projection of a vehicle, in which a lamp for illumination is turned on and off in correspondence to a circumferential illumination intensity around the vehicle.

DESCRIPTION OF THE RELATED ART

There has been known a control apparatus for vehicular illumination, which turns off a lamp under the condition that a circumferential illumination intensity has reached a level for a light to be turned off, if a set time has lapsed after the circumferential illumination intensity having reached the level of turning off the light, and if the vehicle has run a set distance after the circumferential illumination intensity having reached the level of turning off the light (refer to Japanese Utility Model Application Laid-Open Publication No. 5-56621).

However, in the conventional control apparatus for vehicular illumination in which the lamp is turned off only when the three conditions mentioned above are simultaneously satisfied, for example, such as when having run through a tunnel with the lamp lit, entering a traffic jam immediately after the tunnel, failing to run the set distance because of the traffic jam, then even if the circumferential illumination intensity has reached the level of turning off the light and if the set time has lapsed, the lamp can not be turned off.

Further, for example, when having come to see a sunrise, if the vehicle which has run with the lamp lit during the night stops in a cape, with the engine operating, to wait the sunrise, the light will not be turned off since the vehicle fails in running the set travel distance although the circumferential illumination intensity can reach the level of turning off the light after the sunrise when the set time has lapsed.

SUMMARY OF THE INVENTION

An object of the present invention is to provide a control system as a control apparatus for vehicular illumination which suitably turns on and off a lamp for illumination in correspondence to a circumferential illumination intensity and a running environment of a vehicle.

The present invention will be illustratively described below with reference to FIG. 2 which shows an automatic operation for turning on and off a lamp in accordance with an embodiment of the invention.

To accomplish the object of the present invention, there is provided a control system as a control apparatus for vehicular illumination comprising an illumination detector detecting a circumferential illumination intensity around a vehicle, a timer measuring a time, and a turning on and off control unit turning on and off lamps on the basis of a detected value of the circumferential illumination intensity and a measured time, wherein the turning on and off control unit turns off a head lamp when a first set time T1 has lapsed in a state that the circumferential illumination intensity (referred to "B" herein) is equal to or higher than a first level B1.

In accordance with this invention, since the head lamp is turned off when a first set time T1 has lapsed in a state that the circumferential illumination intensity B is equal to or higher then the first level B1, in the case the vehicle is stopped immediately after a moving to a bright place from a dark place, or in the case the peripheral environment has become bright during a stop in the dark place, the head lamp can be securely turned off.

In an aspect of the invention, there is provided a distance measuring device measuring a travel distance (referred to "L" herein) of the vehicle, and the turning on and off control unit turns off the head lamp when the vehicle has run a first set distance L1 in a state that the circumferential illumination intensity B is equal to or higher than a lower second level B2 (the first level B1>the second level B2).

In accordance with this aspect, since the head lamp is turned off when the vehicle has run a first set distance L1 in a state that the circumferential illumination intensity B is equal to or higher than a second level B2, in the case the vehicle is stopped immediately after a moving to a bright place from a dark place, or in the case the peripheral environment has become bright during a stop in the dark place, the head lamp can be securely turned off.

In another aspect of the invention, there is provided a distance measuring device measuring a travel distance L of the vehicle, and the turning on and off control unit turns on small lamps when the vehicle has run a second set distance L2 in a state that the circumferential illumination intensity B is equal to or lower than a still lower third level B3 (the second level B2>the third level B3), or a second set time T3 has lapsed in a state that the circumferential illumination intensity B is equal to or lower than the third level B3.

In accordance with this aspect, the small lamps are turned on when the vehicle has run a second set distance L2 in a state that the circumferential illumination intensity B is equal to or lower than a third level B3, or a second set time T3 has lapsed in a state that the circumferential illumination intensity B is equal to or lower than the third level B3. For example, in the case the vehicle is stopped due to a traffic jam immediately after entering into a tunnel during a day time, since external light is sufficient at an entrance of the tunnel, there is a fear that light of the head lamp dazzles a forward vehicle, so that it is not desirable to turn on the head lamp, however, it is necessary to turn on a tail lamp for calling attention of a following vehicle. In such a case, since the head lamp is not turned on in correspondence to the illumination at the entrance of the tunnel and small lamps including the tail lamp are turned on after a fixed time has lapsed or when the vehicle has run a fixed distance, both of a dazzling prevention to the forward vehicle and an attention call to the following vehicle can be achieved.

In another aspect of the invention, there is provided a distance measuring device measuring a travel distance L of the vehicle, and the turning on and off control unit turns on the head lamp when the vehicle has run a third set distance L3 in a state that the circumferential illumination intensity B is equal to or lower than a yet lower fourth level B4 (the third level B3>the fourth level B4).

In accordance with this aspect, the head lamp is turned on when the vehicle has run a third set distance L3 in a state that the circumferential illumination intensity B is equal to or lower than a fourth level B4. Generally, the width of a bridge beam is a few meters and is less than 30 m at the longest, so that, for example, when the third set distance L3 is set to be 30 m, the head lamp can be prevented from erroneously turning on even when the vehicle runs under the bridge beam in a traffic jam condition.

In another aspect of the invention, the turning on and off control unit outputs a turning on signal to an illuminating device for meters when the circumferential illumination intensity B is lower than the second level B2.

In accordance with this aspect, since a turning on signal is output to an illuminating device for meters when the circumferential illumination intensity B is lower than the second level B2, the meters can be suitably lighted in correspondence to the circumferential illumination intensity B.

DETAILED DESCRIPTION OF THE PREFERRED EMBODIMENT

An embodiment of the present invention will be described with reference to the accompanying drawings.

Figures 1, 2:
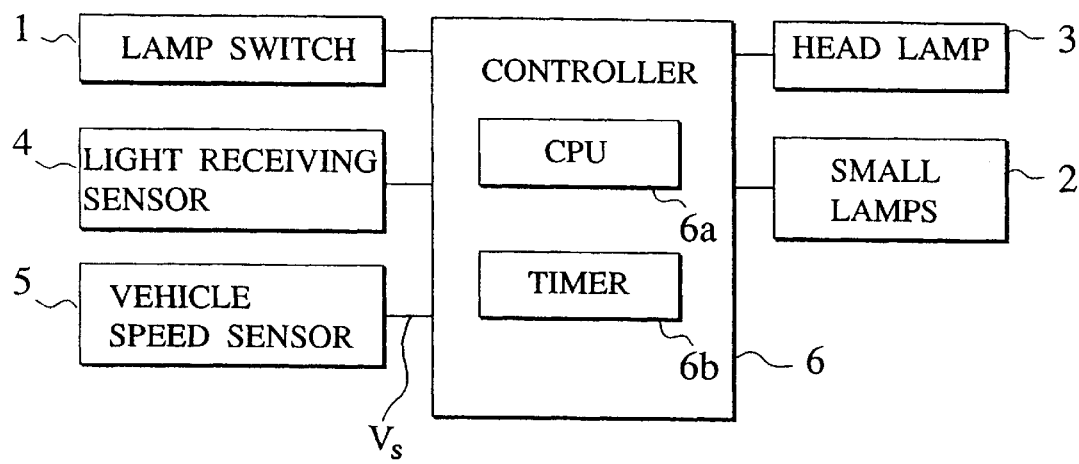
FIG. 1 is a block diagram of a control system according to an embodiment of the invention.
FIG. 2 is a table listing control actions for turning on and off a head lamp and small lamps in an automatic mode of the control system of FIG. 1.

FIG. 1 shows a control system for illumination of a vehicle according to the embodiment. A lamp switch 1 switches the control system between an automatic turning on and off mode (hereafter sometimes called "automatic mode") and a manual turning on and off mode (hereafter sometimes called "manual mode"), and is operative to turn on and off small lamps 2 and a head lamp 3 in the manual mode. In this case, the small lamps 2 include a clearance lamp disposed at the front of the vehicle and a tail lamp disposed at the back of the vehicle. A light receiving sensor 4 detects an illumination intensity around the vehicle, and a vehicle speed sensor 5 outputs a vehicle speed signal Vs as a pulse sequence signal having a period in correspondence to a vehicle speed. A travel distance is measured by counting pulses of the vehicle speed signal Vs. A controller 6 includes a microcomputer having a CPU 6a and peripheral devices such as a timer 6b, and controls the small lamps 2 and the head lamp 3 to turn on and off in the automatic mode as well as in the manual mode.

Figure 3:
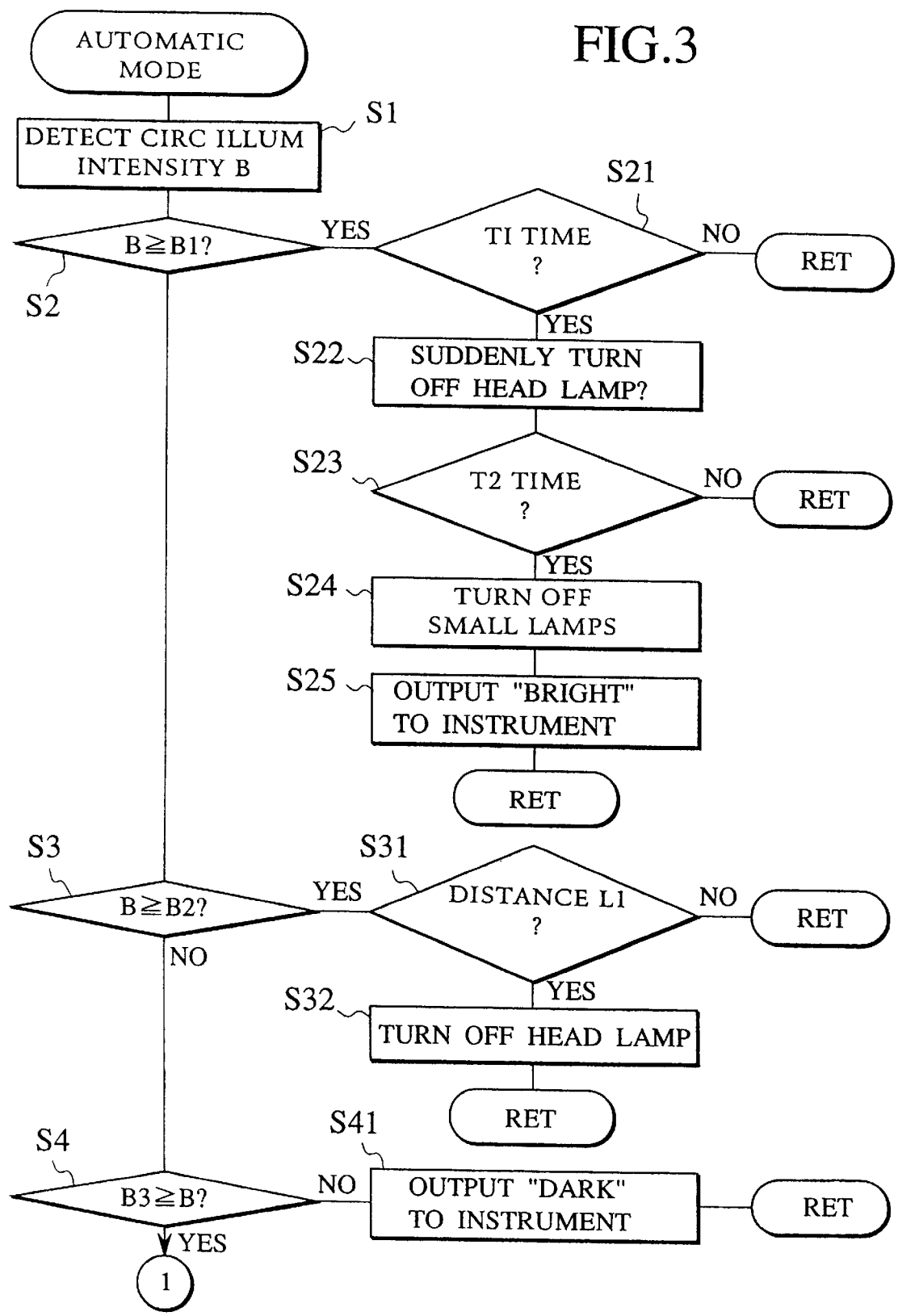
FIG. 3 is a flow chart of control actions in the automatic mode of the control system of FIG. 1.
Figure 4:
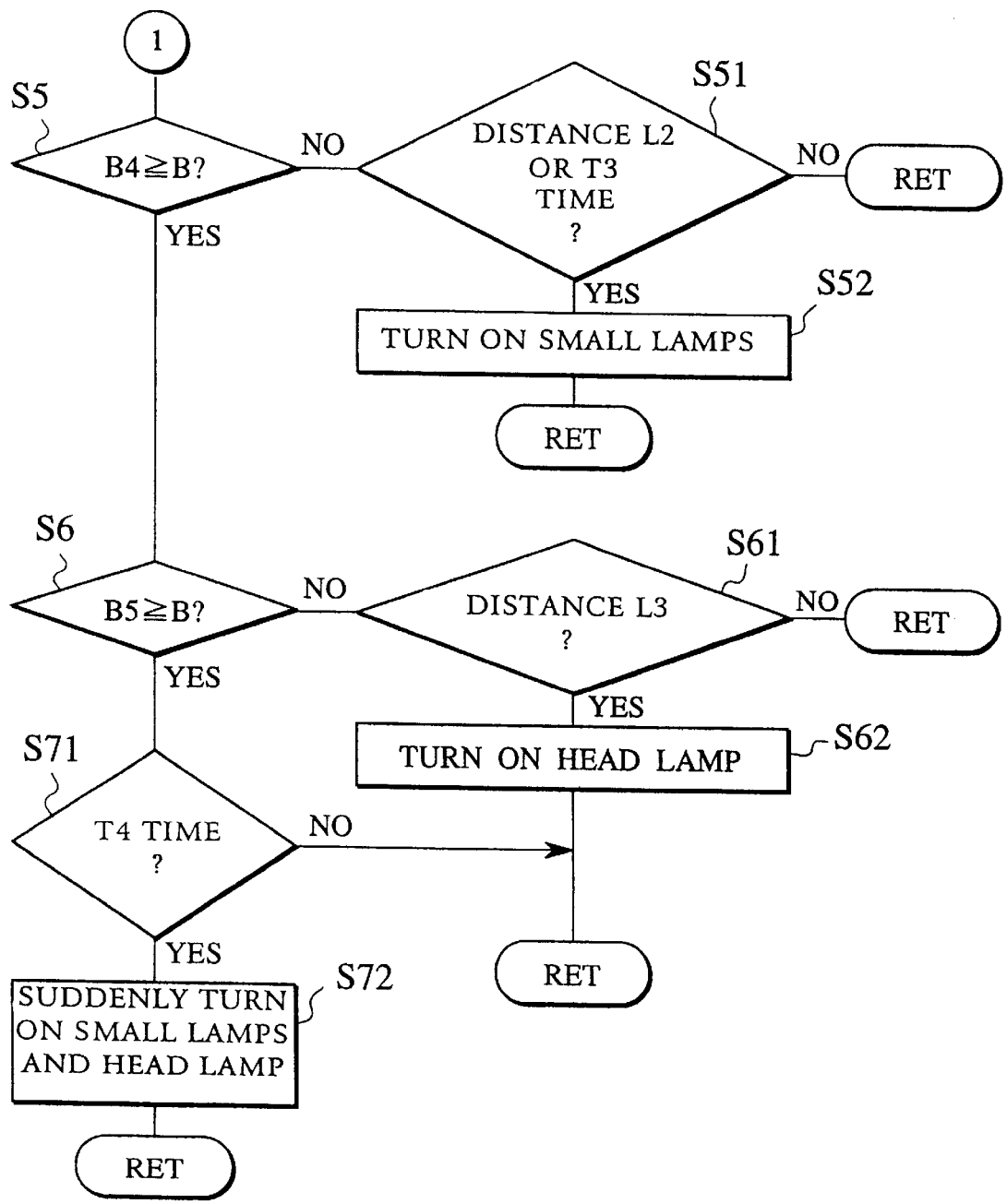
FIG. 4 is a flow chart of additional control actions in the automatic mode of the control system of FIG. 1.

FIG. 2 lists control actions for turning on and off the head lamp 3 and the small lamps 2 in the automatic mode of the system. FIGS. 3 and 4 cooperatively show a flow of control actions in the automatic mode.

In this embodiment, five standard intensity levels B1 to B5 (B1>B2>B3>B4>B5) are provided with respect to an illumination intensity B in the circumference of the vehicle, and the small lamps 2 and the head lamp 3 are automatically turned on or turned off in dependence on an associated level.

For example, letting the illumination intensity B1 be 1000 lux, if the circumferential illumination intensity B is continuously equal to or higher than B1 for a time interval of T1 (for example, 1 second) or more, the head lamp 3 is rapidly turned off (steps S2→S21→S22) and if the circumferential illumination intensity B is continuously equal to or higher than B1 for a longer time interval of T2 (for example, 2 seconds) or more, the small lamps 2 are turned off (steps S23→S24).

In the case the circumferential illumination intensity B is kept equal to or higher than B1 for the T2 time, a "bright" signal is output to a combination meter disposed in an instrument panel of the vehicle, so that an illuminator for the meter is turned off (step S25).

Letting the illumination intensity B2 be, for example, 300 lux, if the vehicle has run for a distance equal to or longer than a prescribed distance L1 in a state that the circumferential illumination intensity B meets a relationship B1>B≧B2, the head lamp 3 is turned off (steps S3→S31→S32).

The control system is implemented such that the head lamp 3 is turned off when the circumferential illumination intensity B is equal to or higher than B1 and if the T1 time has lapsed, or when the circumferential illumination intensity B is equal to or higher than B2 and if the vehicle has run the distance L1, so the head lamp can be securely turned off even if the vehicle is stopped immediately after a moving to a bright place from a dark place, or even if the peripheral environment has become bright during a stop in the dark place.

Letting the illumination intensity B3 be 200 lux, for example, if the circumferential illumination intensity B meets a relationship B2>B>B3, then a "dark" signal is output to the combination meter in the instrument panel, thereby turning on the illuminator for the meter (S4→S41).

Accordingly, the meter can be suitably lighted in dependence on the circumferential illumination intensity B.

Letting the illumination intensity B4 be 70 lux, for example, if the vehicle has run a prescribed distance L2 (for example, 20 m) or a longer distance in a state that the circumferential illumination intensity B meets a relationship B3>B>B4, or when a time interval of T3 (for example, 60 seconds) or a longer time has lapsed, the small lamps 2 are turned on (steps S5→S51→S52).

For example, in the case the vehicle is stopped due to a traffic jam immediately after entering to a tunnel during a day time, since external light is sufficient at an entrance of the tunnel, there is a fear that light of the head lamp dazzles a forward vehicle, so that it is not desirable to turn on the head lamp 3, however, it is necessary to turn on a tail lamp for calling attention of a following vehicle. In such a case, since the head lamp 3 is not turned on in correspondence to an illumination intensity at the entrance of the tunnel and the small lamps 2 including the tail lamp are turned on after the vehicle has run the distance L2 in a state that the circumferential illumination intensity B is equal to or lower than the illumination intensity B3, or when the T3 time has lapsed in a state that the circumferential illumination intensity B is equal to or lower than the illumination intensity B3, both of a dazzling prevention to the forward vehicle and an attention call to the following vehicle can be achieved.

Letting the illumination intensity B5 be 30 lux, for example, if the vehicle has run a distance (for example, 30 m) equal to or longer than the distance L3 in a state that the circumferential illumination intensity B meets a relationship B4≧B>B5, the head lamp 3 is turned on (steps S6→S61→S62).

Generally, the width of a bridge beam is a few meters and is less than 30 m at the longest, so that, for example, in the case the distance L3 is set to 30 m and the head lamp 2 is turned on after the vehicle has run the distance 13 (equals to 30 m for example) in a state that the circumferential illumination intensity B is equal to or lower than the illumination intensity B4, the head lamp 3 is prevented from erroneously turning on even when the vehicle runs under the bridge beam in a traffic jam condition.

When the T4 time or a longer time has lapsed in a state that the circumferential illumination intensity B is equal to or lower than B5, the small lamps 2 and the head lamp 3 are rapidly turned on (steps S6→S71→S72). In this case, for example, the T4 time is set to 0 second.

In this embodiment, a detected value of the circumferential illumination intensity B is compared with the five standard illumination levels so that the turning on and off of the lamps 2, 3 can be controlled, while the number of standard illumination levels and their values are not limited to the embodiment. Further, in the embodiment, the small lamps 2 include a clearance lamp and a tail lamp, however, the small lamps 2 are not limited to the embodiment, and may be a license plate lamp, for example.

In the embodiment, the light receiving sensor 4 constitutes an illumination detector, the vehicle speed sensor 5 and the controller 6 cooperatively constitute a distance measuring device, the timer 6b constitutes a timer, and the controller 6 constitutes a light turning on and off control unit.

What is claimed is:

1. A control system for vehicular illumination, comprising:
   a first detector detecting a circumferential illumination intensity of a vehicle;
   a second detector detecting a travel time of the vehicle;
   a third detector detecting a travel distance of the vehicle associated with the travel time; and
   a controller operative in an automatic mode thereof to turn a head lamp of the vehicle on and off depending on the circumferential illumination intensity, the travel time, and the travel distance, wherein
   the controller has preset values for the automatic mode including a first time, a first distance, a first illuminance, and a second illuminance lower than the first illuminance,
   the controller turns the head lamp off when the travel time exceeds the first time if the circumferential illumination intensity is kept equal to or higher than the first illuminance for the travel time exceeding the first time, and
   the controller turns the head lamp on when the travel distance exceeds the first distance if the circumferential illumination intensity is kept equal to or higher than the second illuminance for the travel distance exceeding the first distance.

2. The control system for vehicular illumination according to claim 1, wherein
   the controller is operative to turn a small lamp of the vehicle on and off depending on the circumferential illumination intensity, the travel time, and the travel distance,
   the preset values include a second time, a second distance, and a third illuminance lower than the second illuminance, and
   the controller turns the small lamp on when the travel distance exceeds the second distance if the circumferential illumination intensity is kept equal to or lower than the third illuminance for the travel distance exceeding the second distance, or when the travel time exceeds the second time if the circumferential illumination intensity is kept equal to or lower than the third illuminance for the travel time exceeding the second time.

3. The control system for vehicular illumination according to claim 2, wherein the preset values include a third distance, and a fourth illuminance lower than the third illuminance, and
   the controller turns the head lamp on when the travel distance exceeds the third distance if the circumferential illumination intensity is kept equal to or lower than the fourth illuminance for the travel distance exceeding the third distance.

4. The control system for vehicular illumination according to claim 2, wherein the controller outputs a drive signal to an instrument illuminator when the circumferential illumination intensity is lower than the second illuminance.

5. The control system for vehicular illumination according to claim 1, wherein
   the preset values include a second distance, and a third illuminance lower than the second illuminance, and
   the controller turns the head lamp on when the travel distance exceeds the second distance if the circumferential illumination intensity is kept equal to or lower than the third illuminance for the travel distance exceeding the second distance.

6. The control system for vehicular illumination according to claim 1, wherein the controller outputs a drive signal to an instrument illuminator when the circumferential illumination intensity is lower than the second illuminance.

7. A vehicular illumination system comprising:
   a head lamp at a front of a vehicle;
   a first data source responsible for an external illumination intensity of the vehicle to provide a first data representing the illumination intensity;
   a second data source responsible for a travel time of the vehicle to provide a second data representing the travel time;
   a third data source responsible for a travel distance associated with the travel time of the vehicle to provide a third data representing the travel distance; and
   a controller recognizing
      a field defined, for illumination control of the vehicle, by a first parameter representative of the illumination intensity, a second parameter representative of the travel time, and a third parameter representative of the travel distance, and
      a first region preset in the field by
         a first set of parameter values including
            a first illuminance as a value of the first parameter, and one of
               a first time as a value of the second parameter, and
               a first distance as a value of the third parameter, and
         a second set of parameter values including
            a second illuminance as a value of the first parameter smaller than the first illuminance, and
               the other of the first time and the first distance,
   the controller being responsible for a given set of the first, second, and third data to control the head lamp to be lit when a corresponding point to the given set of data resides in the first region.

8. A vehicular illumination system according to claim 7, wherein the system comprises an illuminator for an instrument of the vehicle, the controller recognizes a second region preset in the field by
   a third set of parameter values including
      the first illuminance, and
      a second time as a value of the second parameter different from the first time, and
   a fourth set of parameter values including a third illuminance as a value of the first parameter smaller than the second illuminance, and the controller is responsible for the given set of data to control the illuminator to be lit when a corresponding point to the given set of data resides in the second region.

9. A vehicular illumination system according to claim 8, wherein the system comprises a small lamp at a rear of the vehicle, the controller recognizes a third region preset in the field by
a fifth set of parameter values including
the first illuminance, and
the second time, and
a sixth set of parameter values including
a fourth illuminance as a value of the first parameter smaller than the third illuminance and one of
a third time as a value of the second parameter, and
a second distance as a value of the third parameter, and the controller is responsible for the given set of data to control the small lamp to be lit when a corresponding point to the given set of data resides in the third region.

10. A vehicular illumination system according to claim 9, wherein the controller recognizes a fourth region preset in the field by
a seventh set of parameter values including
a fifth illuminance as a value of the first illuminance smaller than the fourth illuminance, and
a third distance as a value of the third parameter, and
an eighth set of parameter values including a fourth time as a value of the second parameter, and
the controller is responsible for the given set of data to control the head lamp to be lit when a corresponding point to the given set of data resides in the fourth region.

* * * * *